(12) United States Patent
Lin et al.

(10) Patent No.: US 8,081,169 B2
(45) Date of Patent: Dec. 20, 2011

(54) COVER LENS WITH TOUCH-SENSING FUNCTION AND METHOD FOR FABRICATING THE SAME

(75) Inventors: Kuan-Ying Lin, Hsinchu County (TW); Chih-Chiang Chang, Hsinchu County (TW); Teng-Yin Cheng, Hsinchu County (TW)

(73) Assignee: Cando Corporation (TW)

( * ) Notice: Subject to any disclaimer, the term of this patent is extended or adjusted under 35 U.S.C. 154(b) by 569 days.

(21) Appl. No.: 12/290,000

(22) Filed: Nov. 10, 2008

(65) Prior Publication Data
US 2010/0039398 A1    Feb. 18, 2010

(30) Foreign Application Priority Data
Aug. 12, 2008    (TW) ................. 97130640 A

(51) Int. Cl.
*G06F 3/041* (2006.01)
(52) U.S. Cl. ............. 345/173; 345/174; 345/38; 345/87

(58) Field of Classification Search .......... None
See application file for complete search history.

(56) References Cited

U.S. PATENT DOCUMENTS

| 2005/0162398 A1* | 7/2005 | Eliasson et al. | 345/173 |
| 2009/0109181 A1* | 4/2009 | Hui et al. | 345/173 |
| 2009/0115733 A1* | 5/2009 | Ma et al. | 345/173 |

* cited by examiner

*Primary Examiner* — Muhammad N Edun
(74) *Attorney, Agent, or Firm* — Bacon & Thomas, PLLC

(57) ABSTRACT

A cover lens with touch-sensing function is provided, which is combined onto an external side of an electronic device and allows the touch-sensing and protection for the electronic device. The provided cover lens is constructed by a tempered substrate, a pattern layer and a touch-sensing layer, where the pattern layer is formed on a first surface of the tempered substrate so as to provide the cover lens with an appearance of periphery-like pattern. The touch-sensing layer is also formed on the first surface of the tempered substrate. The present invention also provides a touch display having such cover lens and the fabricating method thereof.

26 Claims, 6 Drawing Sheets

COVER LENS WITH TOUCH-SENSING FUNCTION AND METHOD FOR FABRICATING THE SAME

BACKGROUND OF THE INVENTION

1. Field of the Invention

The present invention relates to a cover lens and the fabricating method thereof, and more particularly to a cover lens with touch-sensing function.

2. Description of the Related Art

Touch-sensing technology has been widely used for the input of electronic devices of nowadays. In this manner, pressing on the display panel by fingers or stylus allows information access or transmission, which uses no button, keyboard or joystick of a conventional electronic device.

Touch-sensing panel is essentially constructed by upper and lower ITO (Indium Tin Oxide) thin films, or by substrates coated with metal oxide. The upper and lower electrode is electrified via pressure, and then the pressing position is calculated via measuring the voltage change of the panel by a controller.

Touch panel is usually fabricated separately, and then combined to a size-matched flat display device. In other words, in order to provide the flat display device with the function of touch-sensing, touch-sensing panel must be attached by adhering on the surface of the flat display device, and then further covered with a cover lens for protection. As shown in FIG. 1, generally, cover lens 110 is a tempered glass, which is coated with a black ink layer 115 on the surface of the tempered glass by screen printing to form the frame of the cover lens; touch-sensing panel is constructed by a substrate 133 whose upper and lower faces have conductive layers 131 and 132 respectively. Cover lens is coated with an adhering layer, by which the cover lens is directly adhered to the touch-sensing panel 130 having conductive layers 131, 132; or a peripheral bonding layer, by which the cover lens is air bonding to the touch-sensing panel 130 having conductive layers 131, 132 to protect the touch-sensing panel 130. Then, the cover lens is combined to a flat display device 150 by adhering layer 140 to form the touch-sensing display device 100.

However, the above-mentioned structure involves many layers, and is too complicated to fulfill the requirement of electronic device, which is expected to be thin and light. Therefore, a technology of reducing the thickness of touch-sensing panel and simplifying the fabricating method thereof is needed.

SUMMARY OF THE INVENTION

It is one aspect of the present invention to provide an integrated touch-sensing panel with the function of touch-sensing and protection. The touch-sensing panel of the present invention has a thickness thinner than the conventional ones which are covered by cover lens.

It is another aspect of the present invention to provide a method of fabricating cover lens with the function of touch-sensing. The method of the present invention is compatible with the present fabricating process and has simplified procedure to reduce the cost of producing touch-sensing panel.

According to the mentioned aspects of the present invention, a cover lens with the function of touch-sensing is provided. The cover lens is combined onto an external side of an electronic device to provide the function of touch-sensing and protection for the electronic device. The cover lens includes: a tempered substrate; a pattern layer, which forms on a first surface of the tempered substrate to provide the cover lens with an appearance of periphery-like pattern; and a touch-sensing layer, which forms on the first surface of the tempered substrate.

According to the mentioned aspects of the present invention, a touch-sensing display device is provided. The touch-sensing device includes: a display module; and a cover lens, which is configured on the display module and provides the function of touch-sensing. The cover lens includes: a tempered substrate; a pattern layer, which forms on a first surface of the tempered substrate to provide the cover lens with an appearance of periphery-like pattern; and a touch-sensing layer, which forms on the first surface of the tempered substrate.

Preferably, the cover lens of the present invention further includes an overcoat layer, which is formed between the tempered substrate and the touch-sensing layer.

Preferably, the cover lens of the present invention further includes an optical coating layer, which is formed on a second surface of the tempered substrate opposite to the first surface, or between the tempered substrate and the pattern layer.

Preferably, the optical coating layer is an anti-reflection layer, anti-glare layer, anti-smudge layer or the combination thereof.

Preferably, the tempered substrate is a tempered glass substrate.

Preferably, the pattern layer includes a black matrix (BM) layer.

Preferably, the touch-sensing layer is an ITO (Indium Tin Oxide) layer or a transparent electrode layer.

According to the mentioned aspects of the present invention, a method of fabricating a cover lens of touch-sensing panel is provided, which includes the following steps: providing a tempered glass substrate; forming a pattern layer on the tempered glass substrate; and forming a touch-sensing layer on the tempered glass substrate.

Preferably, the pattern layer is formed to provide the cover lens with an appearance of periphery-like pattern.

Preferably, the pattern layer is formed on the tempered glass substrate by printing, coating or depositing.

Preferably, the pattern layer includes a black matrix layer.

Preferably, the fabricating method of the present invention further includes the step of processing the tempered glass substrate such that the tempered glass is provided with a desired optical property.

Preferably, the optical-processing comprises: anti-reflection processing, anti-glare processing, anti-smudge processing or the combination thereof.

BRIEF DESCRIPTION OF THE DRAWINGS

The above objects and advantages of the present invention will become more readily apparent to those ordinarily skilled in the art after reviewing the following detailed descriptions and accompanying drawings, in which.

DETAILED DESCRIPTION OF THE PREFERRED EMBODIMENT

With reference to the following disclosures combined with the accompanying drawings, the sensory structure of capacitive touch panel according to the present invention is illustrated and understood. It should be noted that the accompanying drawings are provided only for illustration where the size or scale of the elements shown therein are not necessarily the actual one.

With reference to FIG. 2A to FIG. 2D, which are a preferred embodiment according to the present invention, the fabricating process and the structure of cover lens with the function of touch-sensing of the present invention is illustrated.

Figure 1:
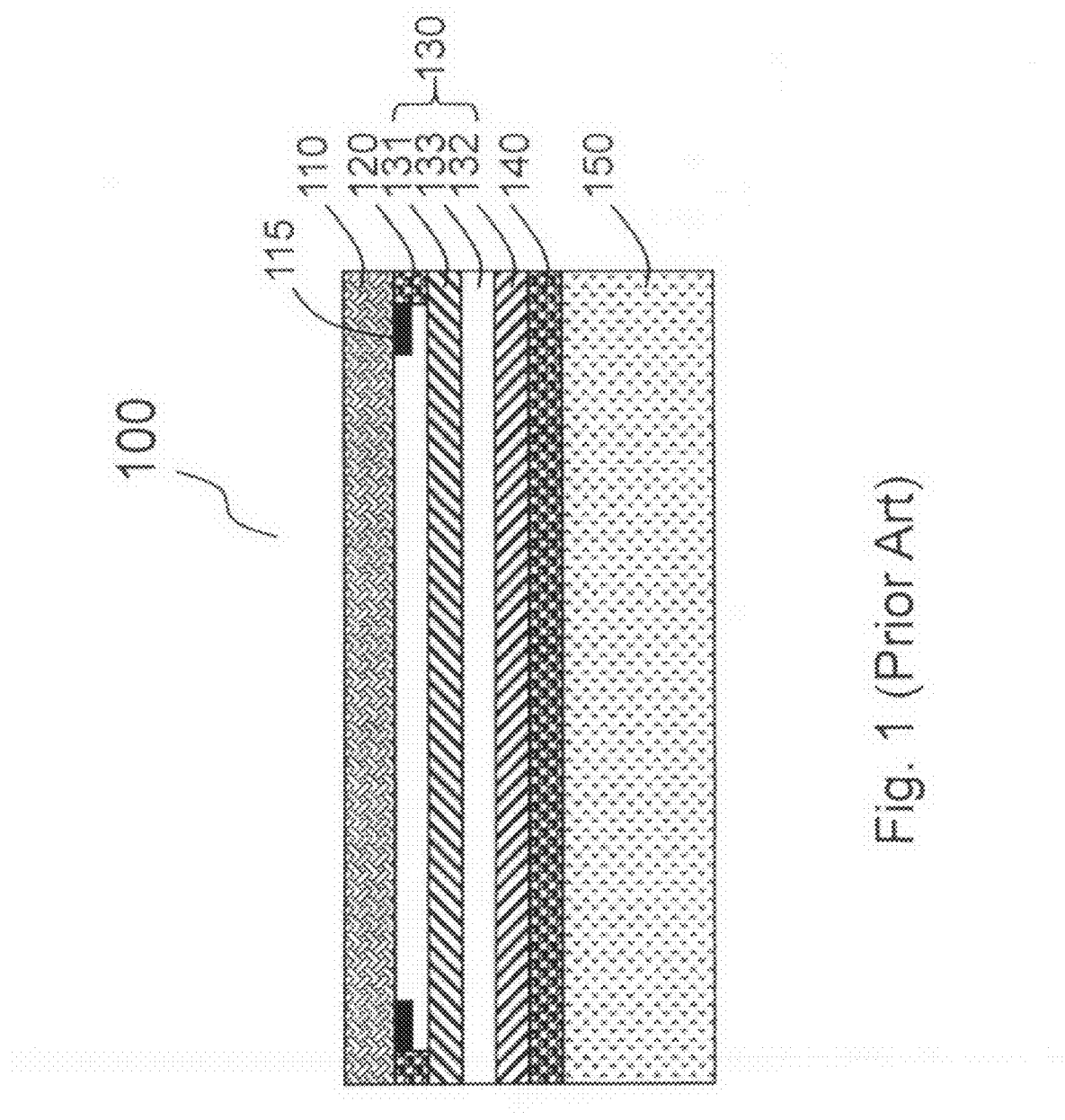
FIG. 1 schematically shows the structure of a conventional touch-sensing flat display device.
Figure 2A:
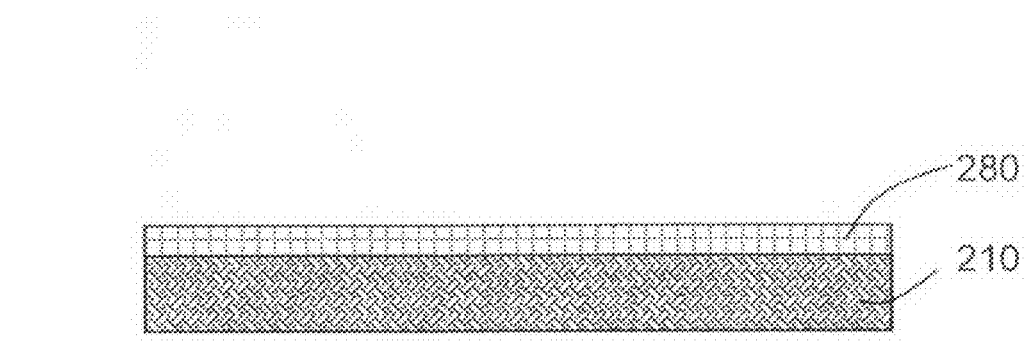
FIG. 2A to FIG. 2D schematically shows the fabricating process and structure of the cover lens according to a preferred embodiment of the present invention.

Firstly, a tempered glass substrate 210 is provided, which is processed to have an optical coating layer 280 on one of its surface, as shown in FIG. 2A. In the present invention, the tempered glass substrate 210 could be optical processed, such as anti-reflection processing, anti-glare processing, or anti-smudge processing, to form a single or multiple optical coating layers 280 which have anti-reflection layer, anti-glare layer or anti-smudge layer, and therefore improve the optical efficiency of the touch-sensing display device.

Figure 2B:
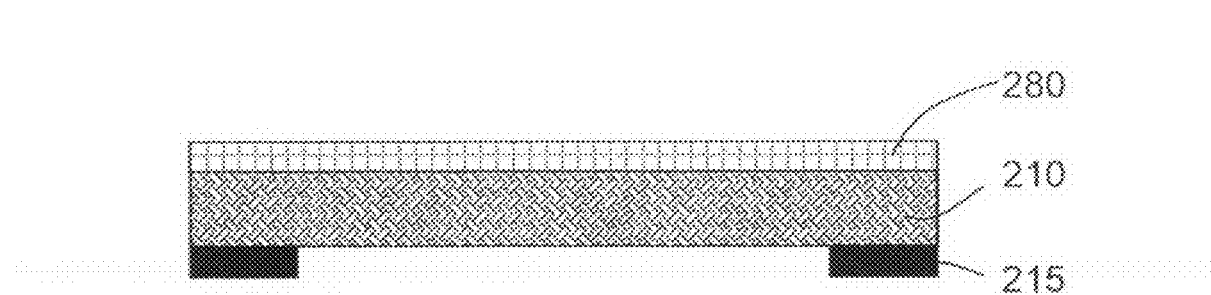
Figure 2C:
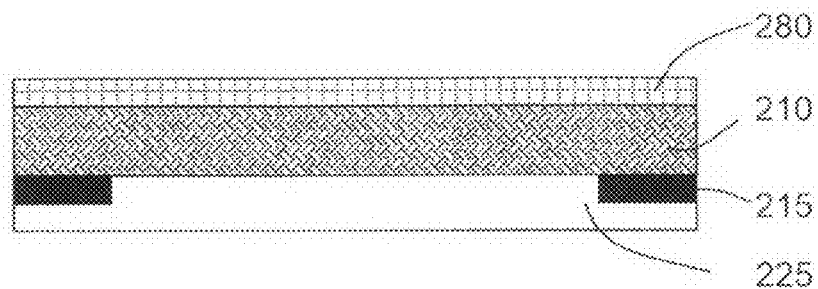

Secondly, a pattern layer 215 is formed on the other surface of the tempered glass substrate 210 by printing, coating or depositing combining etching. The pattern layer 215 is formed to provide the cover lens with an appearance of periphery-like pattern. In the present invention, the pattern layer 215 is a pattern layer with ink frame formed by conventional printing, or is formed by processing the black matrix layer of the touch-sensing panel, as shown in FIG. 2B. After forming the pattern layer 215, an over coat layer 225 is coated on the pattern layer 215, as shown in FIG. 2C.

Figure 2D:
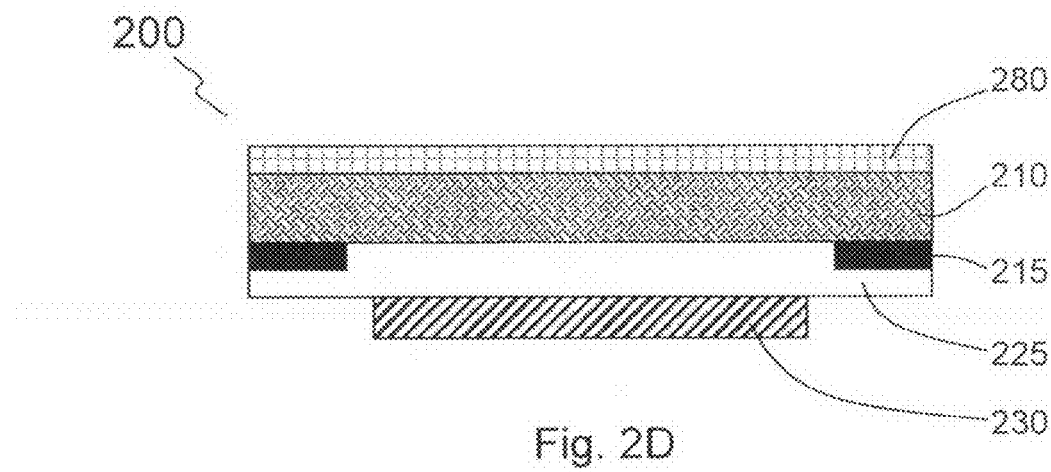

Finally, a touch-sensing layer 230 is formed on the overcoat layer 225 to obtain the cover lens 200 with the function of touch-sensing of the present invention. The touch-sensing layer 230 is a transparent electrode layer or an ITO layer, as shown in FIG. 2D.

In the present invention, the tempered glass substrate 210 is used directly as the substrate of touch-sensing panel, and the necessary frame and touch-sensing layer is formed on the tempered glass substrate 210 to reduce the use of substrate and then reduce the thickness of touch-sensing panel.

Figure 3:
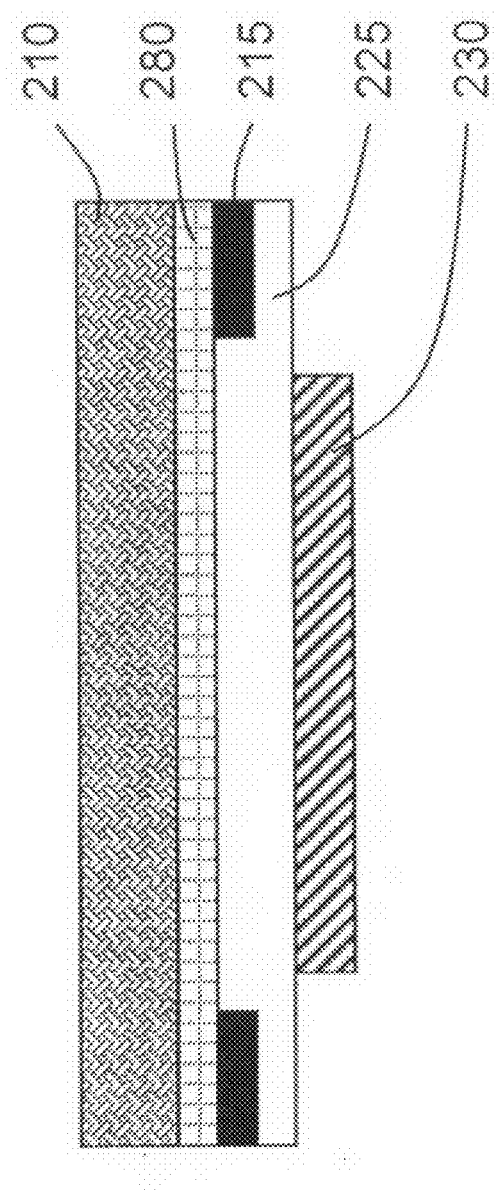
FIG. 3 schematically shows the structure of the cover lens according to another preferred embodiment of the present invention.

In one embodiment of the present invention, the pattern layer 215 is formed on the surface of tempered glass substrate having optical coating layer 280, and then the overcoat layer 225 and the touch-sensing layer 230 are formed thereon sequentially, as the cover lens 200 with the function of touch-sensing shown in FIG. 3.

Figure 4A:
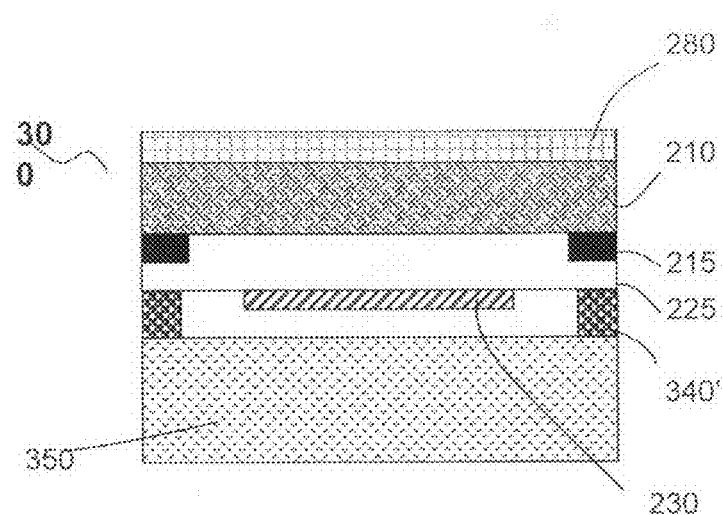
FIG. 4A and FIG. 4B schematically show the cross-section view and top view of the touch-sensing display device according to a preferred embodiment of the present invention.
Figure 4B:
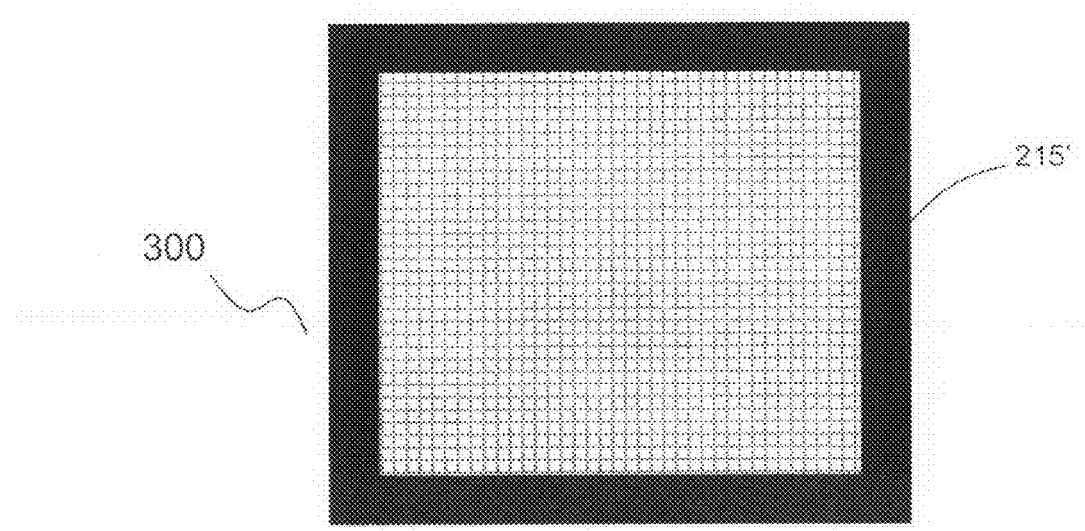

With reference to FIG. 4A and FIG. 4B, which is a preferred embodiment according to the present invention, the cross-section view and top view of the touch-sensing display device of the present invention is illustrated. The touch-sensing display device 300 of the present invention is constructed by air bonding the cover lens 200 with the function of touch-sensing to a flat display module. The cover lens is essentially a tempered glass substrate 210, which is optical processed to have an optical coating layer 280 of anti-reflection, anti-glare or anti-smudge, and a pattern layer 215 to provide the cover lens 200 with an appearance of periphery-like pattern. In one embodiment, the pattern layer 215 is provided by processing the black matrix layer of the touch-sensing panel. Alternatively, in other embodiment, the pattern layer 215 is printed on the ink frame of the tempered glass substrate by screen-printing. The cover lens of the present invention further comprises an overcoat layer 225, on which the touch-sensing layer 230 is formed to provide cover lens 200 the function of touch-sensing.

Figure 4C:
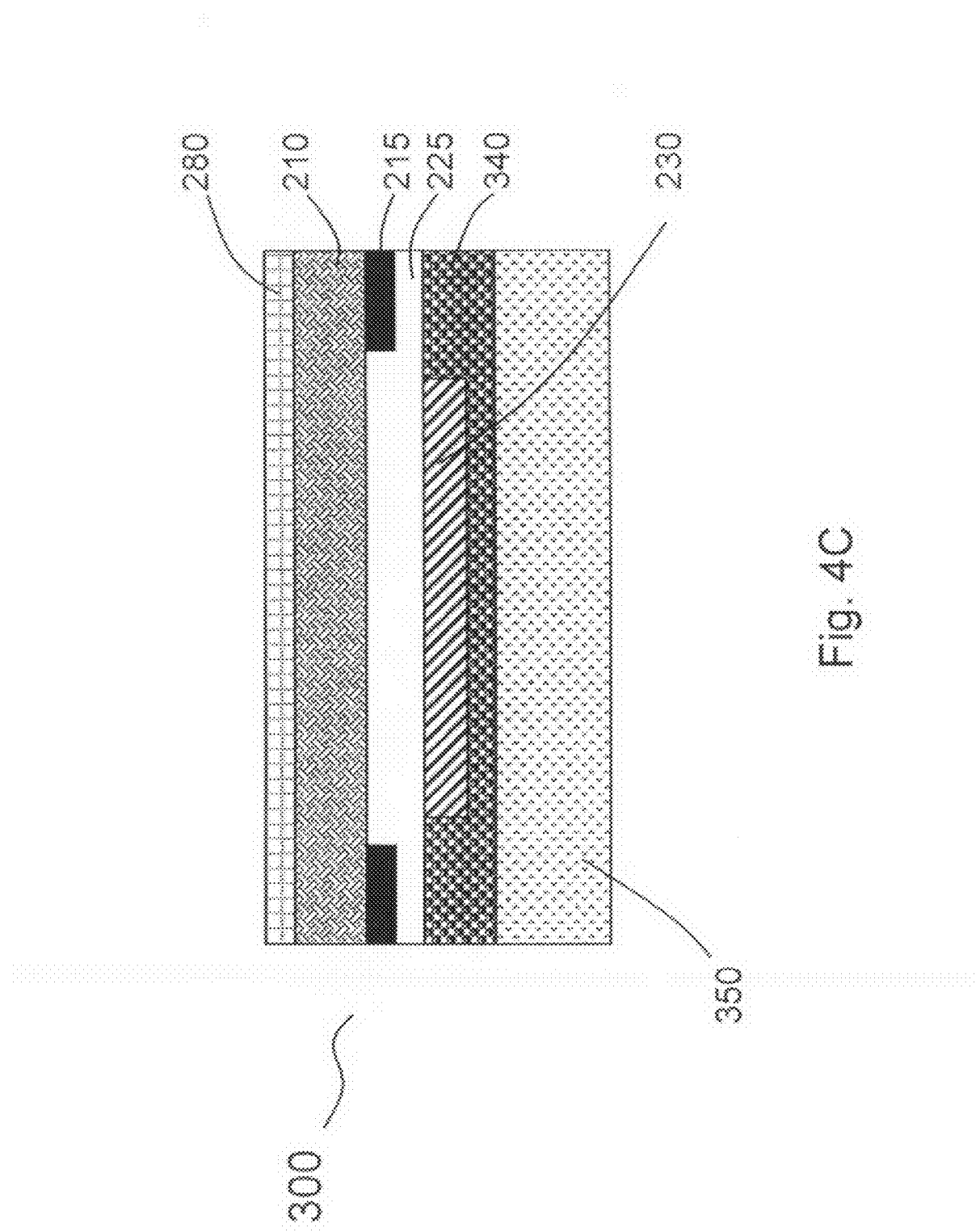
FIG. 4C schematically shows the cross-section view of the touch-sensing display device according to a further preferred embodiment of the present invention

The cover lens 200 with the function of touch-sensing is air bonding to the flat display module 350 by the adhering layer 340 which is coated on the periphery of cover lens, or combining adhering layer 340 and the flat display module by overall coating, as shown is FIG. 4C, to form the touch-sensing display device 300.

As mentioned above, the present provides a novel cover lens, which integrates the function of protection and touch-sensing. The present invention also provides a touch-sensing display device having the cover lens, which uses the tempered glass substrate of the cover lens as the necessary substrate for forming touch-sensing layer to reduce the use of substrate in the entire structure, and then reduce the thickness of touch-sensing panel. Besides, the present invention also provides a method of fabricating the cover lens, which is simple and compatible with the present touch-sensing panel fabricating process, and therefore has the potential of commercialization.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present invention which is defined by the appended claims.

What is claimed is:

1. A cover lens with touch-sensing function configured on an external side of an electronic device for providing the touch-sensing function and protecting said electronic device, comprising:
   a tempered substrate;
   a pattern layer formed on a first surface of said tempered substrate to provide said cover lens with an appearance of periphery-like pattern; and
   a touch-sensing layer directly formed on said first surface of said tempered substrate, wherein said tempered substrate is used directly as the substrate required by said touch-sensing layer.

2. The cover lens of claim 1, further comprising an overcoat layer located between said tempered substrate and said touch-sensing layer, wherein said touch-sensing layer is directly coated on said first surface of said tempered substrate via said overcoat layer, and said touch-sensing layer provides the touch-sensing function.

3. The cover lens of claim 2, further comprising a flat display module constructed to said first surface of said tempered substrate by air bonding via said overcoat layer.

4. The cover lens of claim 1, further comprising an optical coating layer on a second surface of said tempered substrate, wherein said second surface is opposite to said first surface.

5. The cover lens of claim 4, wherein said optical coating layer is one selected from a group consisting of an anti-reflection layer, an anti-glare layer, an anti-smudge layer and a combination thereof.

6. The cover lens of claim 1, further comprising an optical coating layer, located between said tempered substrate and said pattern layer.

7. The cover lens of claim 6, wherein said optical coating layer is one selected from a group consisting of an anti-reflection layer, anti-glare layer, anti-smudge layer and a combination thereof.

8. The cover lens of claim 1, wherein said tempered substrate is a tempered glass substrate.

9. The cover lens of claim 1, wherein said pattern layer comprises a black matrix layer.

10. The cover lens of claim 1, wherein said touch-sensing layer is one of an indium tin oxide (ITO) layer and a transparent electrode layer.

11. The cover lens of claim 1, further comprising a flat display module and an adhering layer, wherein said tempered substrate combines said adhering layer and said flat display module by overall coating.

12. A touch-sensing display device, comprising:
a display module; and
a cover lens configured on said display module to protect said display module and provide the function of touch-sensing, wherein said cover lens comprises:
a tempered substrate;
a pattern layer formed on a first surface of said tempered substrate to provide said cover lens with an appearance of periphery-like pattern; and
a touch-sensing layer directly formed on said first surface of said tempered substrate, wherein said tempered substrate is used directly as the substrate required by the touch-sensing layer.

13. The touch-sensing display device of claim 12, wherein said cover lens further comprises an overcoat layer located between said tempered substrate and said touch-sensing layer.

14. The touch-sensing display device of claim 12, wherein said cover lens further comprises an optical coating layer located on a second surface of said tempered substrate, wherein said second surface is opposite to said first surface.

15. The touch-sensing display device of claim 14, wherein said optical coating layer is one selected from a group consisting of an anti-reflection layer, anti-glare layer, anti-smudge layer and a combination thereof.

16. The touch-sensing display device of claim 12, wherein said cover lens further comprises an optical coating layer located between said tempered substrate and said pattern layer.

17. The touch-sensing display device of claim 16, wherein said optical coating layer is one selected from a group consisting of an anti-reflection layer, anti-glare layer, anti-smudge layer and a combination thereof.

18. The touch-sensing display device of claim 12, wherein said tempered substrate is a tempered glass substrate.

19. The touch-sensing display device of claim 12, wherein said pattern layer comprises a black matrix layer.

20. The touch-sensing display device of claim 12, wherein said touch-sensing layer is one of an indium tin oxide (ITO) layer and a transparent electrode layer.

21. A method of fabricating a cover lens of a touch-sensing panel, comprising the steps:
providing a tempered glass substrate;
forming a pattern layer on said tempered glass substrate; and
directly forming a touch-sensing layer on said tempered glass substrate, wherein said tempered glass substrate is used directly as the substrate required by said touch-sensing layer.

22. The method of claim 21, wherein said pattern layer is formed such that said cover lens is provided with an appearance of periphery-like pattern corresponding thereto.

23. The method of claim 21, wherein said pattern layer is formed on said tempered glass substrate by one of printing, coating and depositing.

24. The method of claim 21, wherein said pattern layer comprises a black matrix layer.

25. The method of claim 21 further comprising processing said tempered glass substrate such that said tempered glass substrate is provided with a desired optical property.

26. The method of claim 25, wherein said processing comprises one selected from a group consisting of anti-reflection processing, anti-glare processing, anti-smudge processing and a combination thereof.

* * * * *